J. GREACEN, Jr.
Rubber Hose.
No. 165,324.
Patented July 6, 1875.
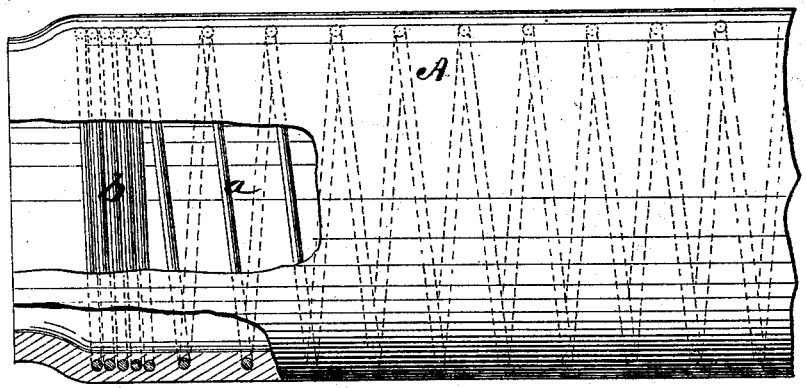
Witnesses:
Inventor:
John Greacen Jr

UNITED STATES PATENT OFFICE.

JOHN GREACEN, JR., OF NEW YORK, N. Y.

IMPROVEMENT IN RUBBER HOSE.

Specification forming part of Letters Patent No. 165,324, dated July 6, 1875; application filed January 14, 1875.

*To all whom it may concern:*

Be it known that I, JOHN GREACEN, Jr., of the city, county, and State of New York, have invented a new and useful Improvement in Rubber Hose; and that the following is a full, clear, and exact description of the same, reference being had to the accompanying drawings, and to the letters of reference marked thereon, making a part of this specification.

This invention is in the nature of an improvement in rubber hose; and the invention consists in rubber hose constructed with a smooth interior surface strengthened by a tempered-steel wire-coil, and the ends of the hose re-enforced by winding the untempered ends of the steel wire-coil around the same in a succession of rings.

In the accompanying sheet of drawings, Figure 1 is a side elevation of my invention, partly in section.

The ends of hose—particularly suction-hose—are frequently exposed to dangers from accident, and the yielding nature of the rubber of which the hose is constructed makes it desirable that a firm foundation should be obtained, so that the couplings may be firmly and tightly secured to the hose in a way that shall prevent leakage. Besides, hose that has heretofore been strengthened by a metal coil depends mainly upon the rubber as a means of securing the ends of the metal coil; hence these ends not unfrequently, from their elasticity or otherwise, work through the walls of the hose, and when once the end becomes thus free, in a short time still more of the coil will be freed, and the entire hose ultimately destroyed.

To obviate these objections I construct my hose A by forming a core of rubber upon a mandrel. A length of tempered wire, $a$, from one end of which the temper has been withdrawn, is then wound around the core until the untempered portion forms a series of rings, $b$, lying closely together and at right angles to the axis of the hose. The untempered wire having little or no elasticity, remains tightly in position, and the rest of the wire, which retains its temper, is then coiled around the core spirally, at equal distances, until the end of the hose is reached, when the temper is drawn from the other end of the steel strengthening wire, and this untempered portion is wound around the end of the hose at right angles to its axis, in the manner before described. The wire is then covered with rubber, or canvas and rubber, or built up in any desired manner.

The hose being in this way constructed, it will be found that its ends are rigid and inelastic, and, in addition, they are re-enforced to an extent that will enable them to resist almost any accident that they may be subjected to, besides affording a good and substantial surface to connect the couplings.

Having thus described my invention, what I claim as new, and desire to secure by Letters Patent, is—

A suction-hose, constructed with tempered-steel wire, the ends of the wire being untempered, and wrapped around the ends of the hose in a succession of rings lying closely together and at right angles to the axis of the hose, whereby the ends of the hose are re-enforced, substantially as and for the purpose described.

JOHN GREACEN, JR.

Witnesses:
H. L. WATTENBERG,
G. M. PLYMPTON.